July 29, 1969

M. M. SCHWARTZ ET AL 3,457,630

FLUXLESS BRAZING OF ALUMINUM

Filed March 6, 1967

INVENTORS
ROBERT B. O'KEEFFE
MELVIN M. SCHWARTZ

BY *Sughrue, Rothwell, Mion, Zinn & Macpeak*

ATTORNEYS

INVENTORS.
ROBERT B. O'KEEFFE
MELVIN M. SCHWARTZ

ATTORNEYS

United States Patent Office 3,457,630
Patented July 29, 1969

3,457,630
FLUXLESS BRAZING OF ALUMINUM
Melvin M. Schwartz and Robert B. O'Keefe, Baltimore, Md., assignors to Martin-Marietta Corporation, New York, N.Y., a corporation of Maryland
Filed Mar. 6, 1967, Ser. No. 620,840
Int. Cl. B23k 1/04, 31/02
U.S. Cl. 29—494
5 Claims

ABSTRACT OF THE DISCLOSURE

A process for brazing aluminum within a vacuum furnace using a fluxless braze alloy and a natural or artificial barrier to prevent direct exposure of the brazing alloy filler to the vacuum furnace interior.

---

In the fabrication of lightweight metallic assemblies, aluminum or aluminum alloys commonly form the base metal because they are relatively inexpensive, sufficiently strong and may be readily joined to themselves and other metals. In joining aluminum alloy parts, by brazing, it is necessary to break down the thin oxide film on the exposed surface of the parts. Conventionally, to break down the oxide film, organic fluxes have been either used separately or as a part of the brazing alloy or filler. These fluxes involve organic chemical compounds in chloride or fluoride form, such as lithium chloride or potassium chloride. The flux, when subjected to increased temperature, breaks down the oxide film to a greater or lesser extent, depending upon the extent of time which has passed subsequent to cleaning of the part, the thoroughness with which the part has been cleaned and the storage environment. Regardless of the type of cleaning process, within seconds after removal of the part from cleaning apparatus, an oxide film of sufficient thickness to seriously affect brazing appears. The presence of the oxide film prevents the wetting of the base metal surface under conventional brazing techniques in the presence of a fluxing agent either as a brazing alloy or as a precoat.

The residual flux present in radiators, heat exchangers, wave guide fittings or in areas involving the employment of chemicals contacting the part, such as in nuclear applications, is highly undesirable since it poisons the part's function. Further, there are certain product areas, such as condensers and evaporators, in which the service requirements are too severe to allow the use of organic adhesives or other joining materials, since the organic adhesives are often unsuitable for operation at cryogenic or moderately high temperatures.

There have been attempts to utilize vacuum furnaces for the brazing of steel, titanium or refractory metal parts. In one known process, the subjecting of the steel base metal parts to vacuum pressures in the order of $1 \times 10^{-3}$ torr has allowed the parts to be brazed with a getter material acting in conjunction with a nonflux brazing alloy to ensure a brazed joint of sufficient strength. Subjecting the steel or steel alloy base metal to a vacuum of this magnitude, at increased temperature, tends to break down the oxidation.

It is, therefore, a primary object of this invention to provide an improved method for brazing aluminum alloy base metal parts which completely eliminates the need for organic flux.

It is a further object of this invention to provide an improved, fluxless brazing method for brazing aluminum parts in which the oxidation on the base metal is readily broken down by subjecting the assembly to relatively high vacuum as the parts are brought to brazing temperature.

It is a further object of this invention to provide an improved process for the fluxless brazing of aluminum alloy parts within a vacuum furnace while preventing any loss of the brazing alloy components by the vacuum producing means as the assembly is brought up to brazing temperature.

Other objects of this invention will be pointed out in the following detailed description and claims and illustrated in the accompanying drawings which disclose, by way of example, the principle of this invention and the best mode which has been contemplated of applying that principle.

Figure 1:
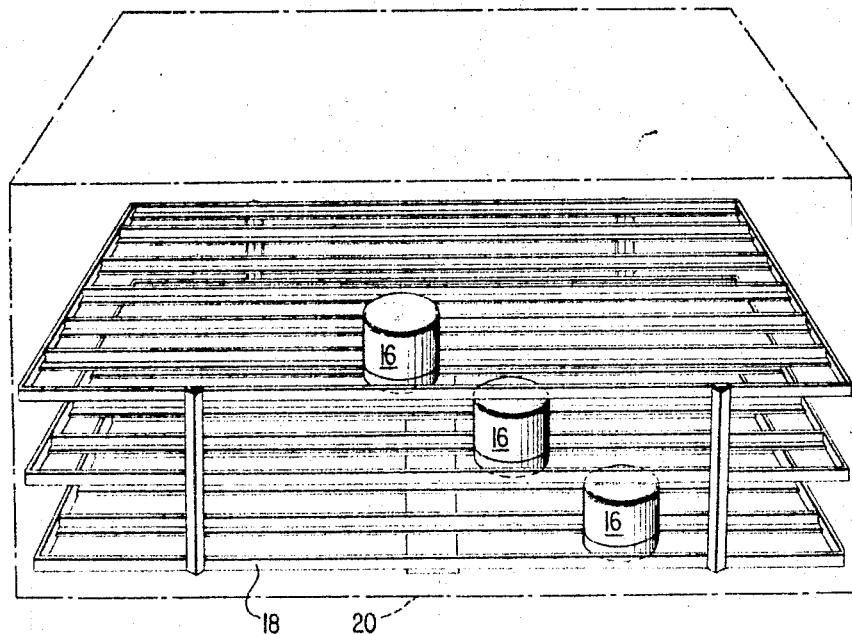
FIGURE 1 is a perspective view of a number of aluminum alloy cup assemblies positioned within a low pressure vacuum furnace for brazing under the method of the present invention.

In general, the present invention is directed to an improved method of fluxless brazing of an assembly of aluminum alloy base metal parts in a low pressure vacuum furnace. The method involves the steps of subjecting the assembly including a fluxless braze alloy filler to a vacuum pressure of not less than $1 \times 10^{-4}$ torr, while raising the assembly to a temperature on the order of 1080° F. to 1100° F. The method includes the step of simultaneously preventing the direct exposure of the fluxless brazing alloy filler to the interior of the vacuum furnace to prevent the dissipation of a nonflux brazing alloy component by the vacuum producing means as the assembly is brought up to brazing temperature.

The step of preventing the direct exposure of the filler to the interior of the furnace involves the placement of an artificial shield or barrier, such as wrapping a thin film of aluminum alloy about the assembly prior to positioning the assembly within the vacuum furnace, or alternatively, the assembly to be brazed may be of such a configuration as to inherently shield the filler from direct exposure to the vacuum furnace interior.

The brazing method of the present invention has particular application to aluminum alloys known as 2002, 3003, 6061 and 2219, 6062, 6066, 7005, 6951. Number 718 braze alloy performs well as the filler material, comprising 12% silicon and 88% aluminum, although aluminum braze alloys comprising 8 to 18% silicon and 92 to 82% aluminum are acceptable.

Turning to the drawings, the base metal assembly parts or components to be brazed, are positioned within a vacuum furnace for brazing under the method of the present invention. The initial step in producing good brazed joint resides in the step of cleaning the aluminum surfaces to be brazed. The cleanliness of the surface to be brazed is highly critical and brazing must take place within 12 hours of the part being cleaned to ensure satisfactory breakdown of the oxide surface by the application of increased temperature at vacuum pressures of $1 \times 10^{-4}$ torr and below.

The cleaning procedure in step form is as follows:

(1) Vapor or solvent degrease if parts are oily or greasy.

(2) Soak in mild etch-type alkaline cleaner for 1 to 2 minutes (mild etch-type containing silicates and tri-sodium-phosphates and sodium hydroxide).

(3) Rinse in warm water.

(4) Rinse in cold running tap water or spray.

(5) Dip in 50–60% nitric acid by weight (approximately 80–90% by volume) for 1 to 2 minutes.

(6) Dip in nitric-hydrofluoric acid solution 30–40% nitric acid by weight (approximately 50% by volume), 2–3% hydrofluoric acid by weight (approximately 3 to 4% by volume 60% hydrofluoric acid).

(7) Rinse in running tap water.

(8) Spray rinse.

(9) Oven dry in air not to exceed 230° F.

The above procedure steps may be modified, for instance, if the parts retain a smut on the surface, the parts may be dipped in the nitric acid solution (step number 5) after the first rinse (step number 7) and then the rinse steps 7, and 8 are repeated.

The aluminum alloy base metal components may comprise cup halves 12 and 14 (FIGURE 2) forming cup-shaped assemblies 16. The cup-shaped assemblies may be suitably positioned upon a rack 18 in the manner shown and placed within a conventional low pressure vacuum furnace, indicated by the dotted lines 20. The vacuum furnace 20 is quite conventional, but must be capable of providing internal environmental temperature in the order of 1200° F. and must be capable of producing a vacuum pressure below $1 \times 10^{-4}$ torr, preferably on the order of $1 \times 10^{-6}$ torr.

Figure 2:
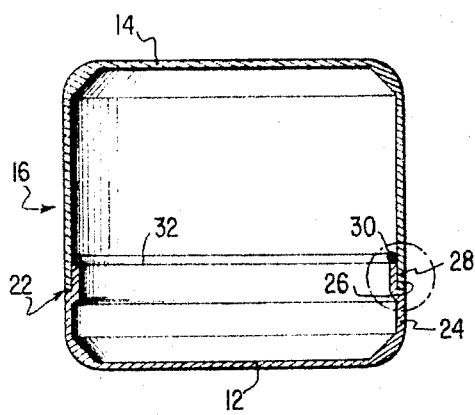
FIGURE 2 is a sectional view of one of the aluminum alloy cup assemblies shown in FIGURE 1.

Referring to FIGURE 2, the hollow, cylindrical, cup-shaped assembly 16 including a base member 12 and cover member 14 are coupled by a circumferential braze joint, indicated generally at 22. The assembly 16 is exemplary, only, of one type of aluminum alloy base metal assembly in which the configuration of the base metal parts form a natural barrier or shield preventing the direct exposure of the braze alloy or filler to the interior of the vacuum furnace 20.

Figure 3:
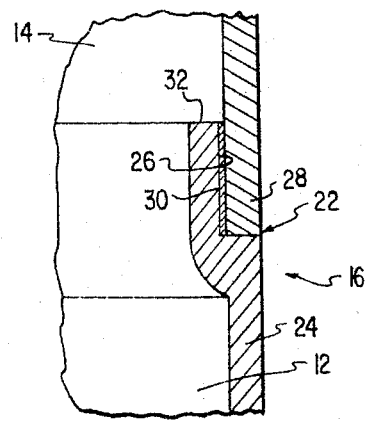
FIGURE 3 is an enlarged view of a portion of the cup shown in FIGURE 2 in the area of the brazed joint.

In this respect, by reference to FIGURE 3, the base member 12 of the hollow, cylindrical casing assembly 16 has its side wall 24 relieved at 26. The end of the cover side wall 28 is received within the relieved section 26 of the base member, preferably with a slight force fit. Filler material in the form of a nonflux brazing alloy wire 30 is circumferentially positioned on the edge 32 of the base member 12 prior to brazing (FIGURE 2). The fluxless brazing alloy 30 preferably comprises 88% aluminum and 12% silicon, conventionally known as a No. 718 braze alloy, although the composition percentages may vary from 82 to 92% aluminum and 18 to 8% silicon and still provide acceptable braze joints when used with conventional aluminum alloys, such as #2002, #3003, #6061 and #2219 and others. The hollow, cylindrical casing assembly 16 may be formed from any one of the above-mentioned aluminum alloys.

It is important to note that, as best indicated in FIGURE 3, the fluxless brazing alloy wire 30 is naturally shielded from the vacuum environment of the vacuum furnace by the mechanical joint connection between the two parts. Thus, the actual configuration of the aluminum alloy elements to be brazed prevents the direct exposure of the fluxless brazing alloy filler 30 from the internal surfaces of the vacuum furnace. In brazing the assembled casing sections, a plurality of the casing members may be positioned upon a rack 18 at different levels, but confined within the vacuum furnace and subjected to identical brazing temperature and vacuum conditions. With the pressure within the chamber 20 reduced to a minimum of $1 \times 10^{-4}$ torr vacuum and preferably $1 \times 10^{-6}$ torr, the environmental temperature within the vacuum furnace is raised until the melting temperature of the brazing alloy is reached. Because the assembly is subjected to a very high vacuum, the vacuum acting in conjunction with the temperature causes the oxide film inherently present to the surfaces of the aluminum alloy assembly components to break down, allowing the joint surfaces between the components to be wetted by the brazing alloy. Due to the presence of the vacuum, brazing occurs at a temperature on the order of 1085 to 1090° F. rather than under the conventional atmospheric pressure and flux techniques, whereby it is normally necessary to heat the aluminum alloy assembly to a temperature more in the order of 1100 to 1120° F. Melting of the braze alloy wire 30 results in rapid wetting of the joint surfaces between the contacting side wall portions of the two parts, as best seen in FIGURE 3. A slightly lower vacuum exists outside the assemblies, readily causing the desired fluxless brazing alloy to flow down the joint area, as shown.

Figure 4:
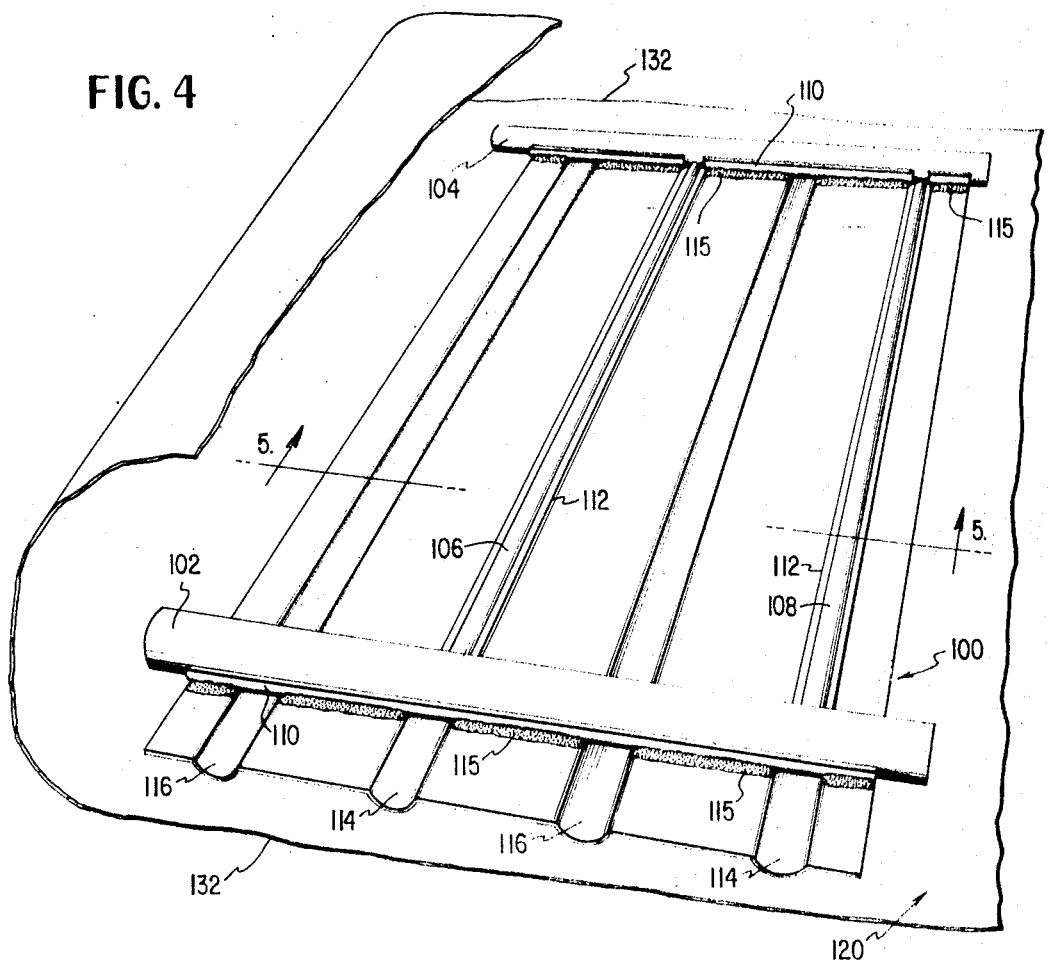
FIGURE 4 is a perspective view of another typical aluminum alloy parts assembly, including the artificial shielding means of the present invention.
Figure 5:
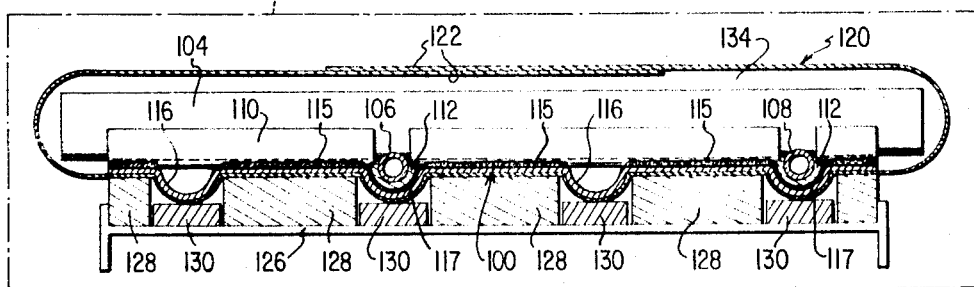
FIGURE 5 is a sectional view of the assembly shown in FIGURE 4, positioned within the vacuum furnace for brazing.

It is also important to note that if the thin layer of filler material 30 were directly exposed to the environmental conditions of the vacuum furnace at the low pressures on the order of $10^{-6}$ torr, there would be a tendency, as the assembly is brought up to brazing temperature, for the silicon component of the braze alloy to vaporize and be removed from the furnace by the vacuum producing apparatus (not shown). In fact, tests have proven that the composition percentage of silicon in the silicon-aluminum braze alloy under such conditions may be reduced from its normal 12% value to a value as low as 6%. Under these circumstances an incomplete braze results between the base metal parts due to the absence of sufficient silicon. In brazing as assembly components, such as the cup halves 12 and 14, the end wall 28 of the cover actually hides the filler material from the vacuum furnace environment and prevents the dissipation of the silicon component of the braze alloy. It is the shielding function of the assembly configuration that ensures a complete braze at the joint area 22.

Where the aluminum assembly to be brazed does not provide the natural shield required to ensure a complete and high strength braze joint between the aluminum parts, it is necessary to create an artificial shield or barrier. Reference to FIGURES 4 and 5, shows a typical aluminum alloy structural assembly including a preformed aluminum alloy base plate 100 to which is attached a series of fluid carrying conduit members. Spaced headers 102 and 104, which may be formed of stainless steel, are connected by transverse conduits 106 and 108 which also may be formed of stainless steel. To securely attach the fluid handling conduit members to the base plate 100, intermediate conduit supporting members 110 and 112 are employed. In this respect, U-shaped aluminum alloy support member 110 couples the headers 102 and 104 to base plate 100, while U-shaped members 112 are positioned beneath the transverse conduits 106 and 108, within formed grooves or depressions 114 carried by the base plate 100. Other transverse grooves or depressions 116 are formed within the same base plate but do not receive conduits. The manner in which the transverse conduit sections 106 and 108 are joined to the headers 102 and 104 is immaterial and forms no part of the present invention. Suitable fluxless brazing alloy in the form of a thin precoat, for instance, is applied to the top surface of the base plate 100 as at 115, while at the same time fluxless brazing alloy or filler 117 is provided between the bottom surface of the U-shaped guides 112 and the upper surface of the plate groove 114.

The assembly is now ready for fluxless brazing in a vacuum oven under the method steps of the present invention. Of course, since the assembly obviously has filler material which is directly exposed to the environment within the vacuum furnace, it is necessary to create an artificial shield to prevent the dissipation of the silicon portion of the fluxless brazing alloy composition. In this respect, a thin sheet of aluminum foil 120 is wrapped about the assembly, as best indicated in FIGURE 5, with the ends 122 overlapped. The assembly, as wrapped, is positioned within the conventional vacuum over 124 on appropriate support means. For instance, a supporting table 126 is provided including support blocks 128 which are greater in height than other support blocks 130 to compensate for the presence of grooves 114 and 116. In this way, the ungrooved areas of the base plate 100 are supported by the blocks 128 of larger height, while the blocks 130 support the grooved portions 114 and 116. Obviously, when the assembly is brought up to brazing temperature, the aluminum tends to soften and would sag unless appropriately supported to prevent thermal distortion. It is noted that the ends 122 of the aluminum foil sheet 120 overlap and are maintained in overlapped relation purely by gravity. It is not a purpose to effect a complete seal of the base metal assembly within the aluminum foil shield. Rather, the edges 132 of the foil loosely contact each other but are not crushed or rolled over in an attempt to effect some type of positive seal so as to absolutely prevent the environment of the vacuum chamber from reaching the interior of the area 134 within the foil sheet 120 occupied by the assembly 100. Brazing takes place again at a temperature on the order of 1080° F. under vacuum conditions of $1 \times 10^{-6}$ torr within 2 minutes. The fact that satisfactory braze occurs only if the components are effectively shielded such that the fluxless brazing alloy or filler does not see the side walls of the vacuum furnace, may be because of the fact that, even though there is no positive seal created by the natural or artificial shield, the pressure within the shield area will be slightly greater than the $1 \times 10^{-6}$ torr vacuum pressure within the furnace chamber proper. In any case, the foil acting as a shroud or barrier merely overlies the parts being brazed but is sufficient in ensuring that the silicon component of the fluxless braze alloy is not driven off by the vacuum producing means prior to reaching effective braze temperature.

With the present technique, 100% reliability on the brazed joint is assured, no corrosion due to the presence of organic flux is possible and the aluminum assemblies are highly compatible with other metal structures, since there can be no electrolytic reactions which would normally occur from the presence of organic flux. Since the silicon component of the brazed alloy is not dissipated by vaporization, which would occur upon normal exposure of the filler to the vacuum furnace interior, the percentage of brazing alloy components may be closely controlled depending upon the particular base metal alloys to be joined. Obviously, the elimination of flux greatly reduces the overall time required to produce the brazed joint, while at the same time providing a sufficient cost reduction. Since the brazed assembly is characterized by the absence of flux residue, post cleaning of assemblies is completely eliminated.

The fluxless brazing method of the present invention has application to various aluminum base metal alloys. Representative alloys include number 3003 alloy comprising 1.2% manganese and 98.8% aluminum. The process has been used with number 2219 aluminum alloy including 5.8 to 6.8% copper, .020 to .040% manganese, .02 to 0.1% titanium, .05 to 1.5% vanadium and 0.10 to 0.25% zirconium.

1.25 inch gauge 6061 aluminum alloy sheet material was brazed by the method of the present invention and tensile strength tests were applied to representative test specimens subsequent to brazing. Number 6061 aluminum alloy comprises 0.25% copper, 0.6% silicon, 1.0% manganese and 0.25% chromium with the remainder aluminum in normal impurities. The tests indicated that the failures occurred primarily in the base metal. In performing tensile strength tests, the test specimens were compared to several dip braze metal specimens for comparison. The test results are as follows:

| Area | Ultimate load (lb.) | Strength stress (p.s.i.) | Type of braze | Dimensions |
|---|---|---|---|---|
| .0937 | 880 | 9,400 | Fluxless | .125 x .75 |
| .0937 | 930 | 9,800 | do | .125 x .75 |
| .0937 | 955 | 10,200 | do | .125 x .70 |
| .0937 | 1,030 | 11,000 | Dip | .125 x .75 |
| .125 | 1,218 | 9,750 | Dip | .125 x 1.5 |
| .125 | 1,147 | 9,180 | Dip | .125 x 1.0 |
| .125 | 1,260 | 10,080 | Fluxless | .125 x 1.0 |
| .125 | 1,155 | 9,230 | do | .125 x 1.0 |
| .125 | 1,580 | 12,600 | Base metal | .125 x 1.0 |

From the above table, it is readily apparent that the fluxless brazed joint compares quite favorably with that produced by the conventional flux type dip braze process. The test results also indicate equal or better strengths compared to dip braze assemblies.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of brazing an assembly of aluminum or aluminum alloy base metal parts in a vacuum furnace comprising the steps of: cleaning the parts to be brazed, subjecting the assembly including a silicon-containing fluxless braze alloy filler to a vacuum not less than one times $10^{-4}$ torr, raising the temperature within the furnace to a value on the order of 1080° F. to 1100° F. while preventing the direct exposure of the fluxless braze alloy filler to the vacuum furnace interior.

2. The method as claimed in claim 1 wherein said aluminum alloy base metal includes, as a principal constituent, one element of the group consisting of copper, silicon, magnesium, manganese, chromium, titanium and zirconium.

3. The method claimed in claim 1 wherein said fluxless braze alloy comprises silicon on the order of 8 to 18% and aluminum on the order of 92 to 82%.

4. The method as claimed in claim 1 wherein said step of preventing direct exposure of the fluxless braze alloy filler to the interior of the vacuum furnace comprises wrapping foil about the assembly.

5. A method of brazing an assembly of metal parts of aluminum or aluminum alloy base metal without the use of flux in a vacuum furnace comprising the steps of: cleaning the parts to be brazed; subjecting the assembly, including a fluxless braze alloy filler, to a vacuum; raising the temperature within the furnace to a value sufficient to melt the filler but not the parts to be brazed while preventing the direct exposure of the filler to the vacuum furnace interior.

References Cited

UNITED STATES PATENTS

| | | |
|---|---|---|
| 2,315,294 | 3/1943 | Stewart. |
| 2,614,517 | 10/1952 | Peterson. |
| 2,824,365 | 2/1958 | Erickson _____ 29—502 X |
| 2,837,818 | 6/1958 | Storchheim _____ 29—494 |
| 2,847,756 | 8/1958 | Sangdahl. |

(Other references on following page)

| | | | |
|---|---|---|---|
| 2,907,105 | 10/1959 | Ohmi | 29—498 |
| 2,916,815 | 12/1959 | Donkervoort | 29—504 |
| 2,937,438 | 5/1960 | Lemon | 29—504 X |
| 2,943,181 | 6/1960 | Gunow | 29—494 X |
| 2,987,816 | 6/1961 | Noland | 29—493 |
| 3,055,098 | 9/1962 | Bratkowski | 29—504 X |
| 3,063,145 | 11/1962 | Bouton | 29—499 |
| 3,081,534 | 5/1963 | Bredzs | 29—494 |
| 3,083,452 | 4/1963 | Terrill | 29—488 X |
| 3,112,388 | 11/1963 | Wiant. | |
| 3,180,022 | 4/1965 | Briggs | 29—487 |
| 3,235,959 | 2/1966 | Bartoszak | 29—498 |
| 3,321,828 | 5/1967 | Miller I. | 29—488 |
| 3,322,517 | 5/1967 | Miller II. | 29—197.5 |
| 3,310,388 | 3/1967 | Bennett | 29—501 X |

OTHER REFERENCES

NASA Tech Brief, Aluminum Core Structures Brazed Without Use of Flux, Brief 66–10360, August 1966, two pages.

JOHN F. CAMPBELL, Primary Examiner

J. L. CLINE, Assistant Examiner

U.S. Cl. X.R.

29—504